May 8, 1951 A. MATHISEN 2,551,752
FIRE PREVENTING OR EXTINGUISHING APPARATUS FOR AIRCRAFT
Filed June 11, 1947 2 Sheets-Sheet 1

INVENTOR:
Anders Mathisen
By Benj. J. Chromy
att.

May 8, 1951 A. MATHISEN 2,551,752
FIRE PREVENTING OR EXTINGUISHING APPARATUS FOR AIRCRAFT
Filed June 11, 1947 2 Sheets-Sheet 2
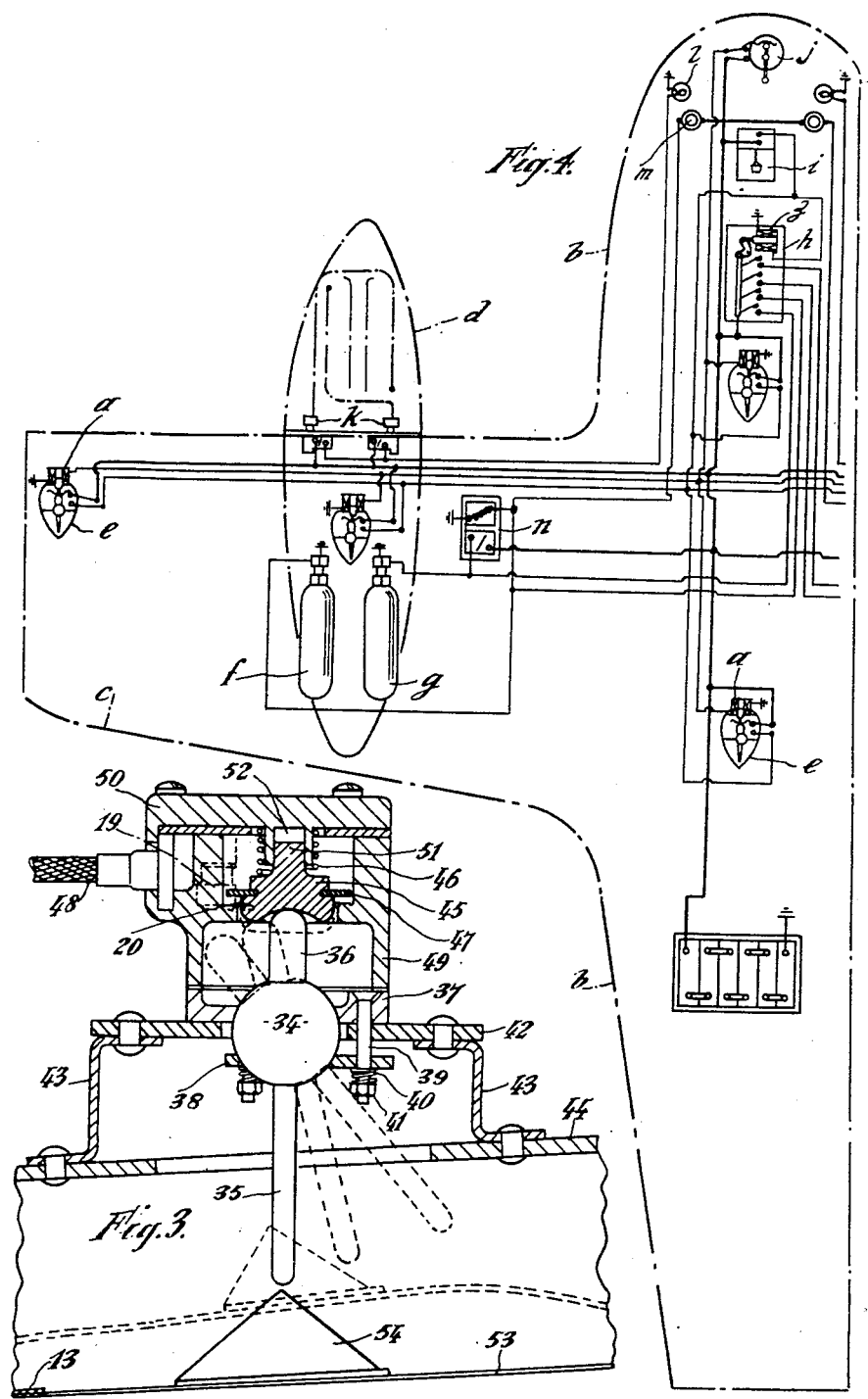
INVENTOR:
Anders Mathisen
By Ben. J. Chromy att.

Patented May 8, 1951

2,551,752

UNITED STATES PATENT OFFICE 2,551,752

FIRE PREVENTING OR EXTINGUISHING APPARATUS FOR AIRCRAFT

Anders Mathisen, London, England, assignor to Graviner Manufacturing Company Limited, London, England, a British corporation Application June 11, 1947, Serial No. 753,939
In Great Britain June 21, 1946

13 Claims. (Cl. 169—2)

This invention relates to aircraft provided with automatic electric switches and to fire preventing and extinguishing systems for aircraft.

The object of the invention is to provide a reliable fire fighting system for an aircraft which will operate automatically in the event of an accident.

With this object in view, an aircraft according to the present invention is fitted with an automatic electric switch device, comprising a switch actuator and an impact detecting member normally positioned so as to hold said switch actuator in an inoperable position, the impact detecting member being mounted adjacent the surface skin of the aircraft and adapted to release the actuator to produce actuation of fire preventing or extinguishing appliances when said aircraft contacts an obstruction.

A fire preventing and extinguishing system made according to the invention incorporates an automatic electric switch as set out in the preceding paragraph together with electric circuit control means for effecting the actuation of fire preventing or extinguishing appliances when an abnormal impact is applied to the aircraft.

Further features of the invention are set out in the appended claims and illustrated in the accompanying drawings which illustrate how the invention may be carried into effect, and wherein—

Fig. 3 shows a slightly modified form of construction of switch device made according to the invention mounted in a manner different from that shown in Figs. 1 and 2.

Fig. 4 illustrates a part outline of an aircraft and the various electrical connections of the devices according to Figs. 1 and 2, or 3, mounted upon the aircraft and interconnected with fire preventing or extinguishing equipment.

Figure 1:
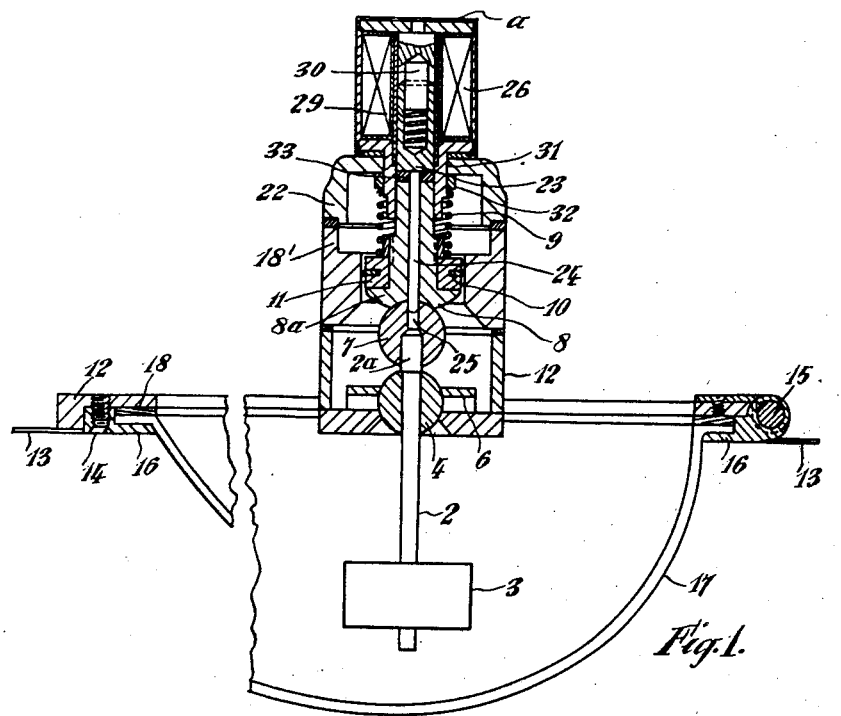
Fig. 1 is a side view of an electrical switch device made according to the present invention and comprising a pendulum impact detecting member of generally known construction, the mechanism being shown in section.

The switch device shown in the drawings is of a generally known kind (see British patent specification No. 423,223) and comprises a pendulum mounted to swivel upon a bracket element, which may constitute part of the aircraft skin surface, and arranged to control electrical switches, which may effect operation of fire extinguishers and/or the operation of electrical circuit breakers upon the aircraft when the pendulum is caused to move under impact, as on a crash landing. Pendulum switches of hitherto known kind are liable to inadvertent operation, for example as a result of vibrations, and the modified constructions shown in Figs. 1 and 2, or 3, have been designed in order to reduce this tendency to untimely operation.

Figure 2:
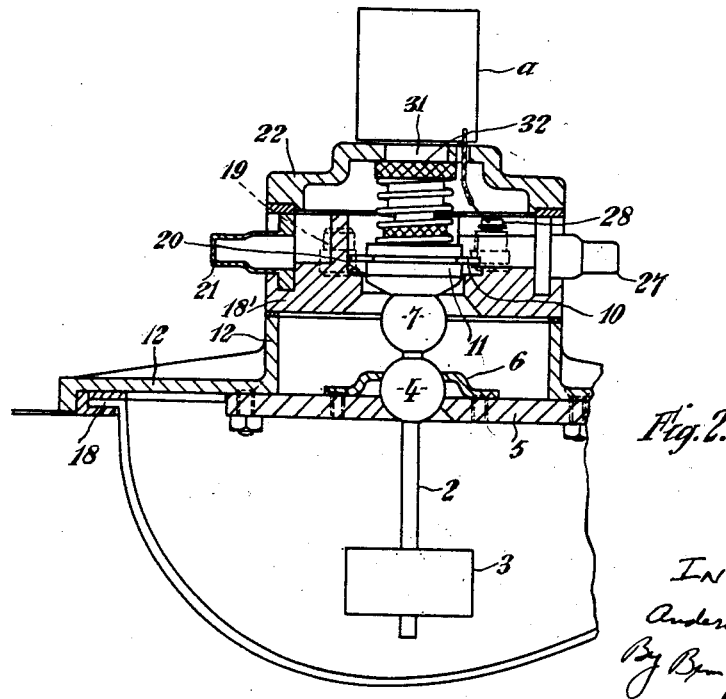
Fig. 2 is a front view of the mechanism shown in Fig. 1 in which the mounting case of the switch is shown in section.

Referring first to Figs. 1 and 2, reference numeral 2 denotes a pendulum arm or spindle carrying a mass 3 and supported by a ball 4 resting upon mounting strip 5 to which it is loosely secured by a bracket member 6. The spindle 2 passes through a drilled hole in ball 4, in which it is a force fit, but an enlarged diameter end 2a of spindle 2 is arranged to rest upon ball 4. A second ball 7 has a drilled hole by means of which it is forced on to the enlarged end 2a and a smaller diameter hole for a purpose to be hereinafter described. Ball 7 serves to retain a spring urged electrical switch closure member 8 in the normal open position. The member 8 is preferably of steel or brass and is provided with a crater surface adapted to engage the surface of the ball 7, as shown in Fig. 1.

If the pendulum spindle 2 and mass 3 are displaced, the switch member 8 will be lifted slightly until the highest point of ball 7 passes below the rim of the crater in member 8, after which the spring 9 which urges member 8 downwards will displace the ball further sideways so as to permit the member 8 to move down into the circuit operating position. The circuit controlling member comprises an electrical contact member 10 mounted in an insulated support 11, these parts being held firmly against a head portion 8a of member 8 by spring 9, as indicated in Fig. 1.

The mounting strip 5 is secured to a frame structure 12 disposed within the skin surface of an aircraft 13 by means of a screw 14 and a hinge 15, which screw and hinge are secured to a secondary frame structure 16, which latter is secured to skin surface 13. The frames 12 and 16 are adapted to clamp by means of a flange 18 an aerodynamically shaped hood 17 which forms a protection for spindle 2 and mass 3. The hood 17 is normally of comparatively light construction such as thin plastic material for example a cellulose plastic and is sufficiently rigid to withstand normal air pressures in flight but sufficiently fragile to fracture if the hood should strike an obstruction, for example, in case of a crash or forced landing, whereby the pendulum spindle 2 and mass 3 would be displaced by the force of the actual impact. On the other hand, if the aircraft strikes an obstruction without damaging the hood 17, the deceleration applied to mass 3 will effect actuation of the switch and the deceleration at which the switch will operate due to impact can be regulated by adjusting correspondingly the tension of spring 9. The normal setting valves of such switches is $3g$ as a minimum and $6$-$8g$ as a maximum, $g$ denoting acceleration due to gravity.

The electrical connections to fire preventing or extinguishing appliances are obtained by cables entering a terminal block device 18' mounted upon frame 12 and provided with known types of terminals 19 and terminal contact points 20. Only one contact point 20 is shown in the drawings but there may be two or more. The connecting cable enters terminal block 18 through a moisture excluding seal fitting denoted 21 and the terminal block is closed by a closure cover 22, both parts 18' and 22 being made of insulating material.

When mounting appliances of the character described in Figs. 1 and 2 upon or adjacent to wing tips of aircraft, risk of inadvertent operation will arise if the wing tips are subjected to abnormal acceleration or deceleration during aerobatic evolutions or the like, and to eliminate such risk of inadvertent operation a locking device is provided comprising a solenoid device $a$, armature 23 of which carries a projecting pin or wire 24 which passes centrally through member 8 and engages in the reduced bore 25 in ball 7 whereby ball 7 is normally firmly locked to member 8, thereby preventing inadvertent displacement of pendulum spindle 2 and mass 3. The arrangement is, however, such that if hood 17 is crushed, for example as a result of impact with the ground, pin 24 will be sheared by ball 7 at the point where it projects from member 8. In this way operation of the switch is ensured in the event of severe crash conditions.

In order to unlock the switch, the energising coil 26 of the solenoid is adapted to be energised by a cable entering terminal block device 18' and cover 22 through a sleeve 27, and connected to terminals 28 to which the coil 26 is connected. When the coil 26 is energised the armature 23 is drawn into the solenoid against action of a spring 29 which abuts at one end against the end of a centrally bored hole in armature 23 and at the other end against a guide pin 30 of non-magnetic material, the armature 23 being then displaced sufficiently to withdraw pin 24 from ball 7.

The solenoid $a$ is secured in the insulation cover 22 of the terminal block 18 by means of a projecting sleeve portion 31 which is screwed to take a locking nut 32 against which spring 9 abuts. A greased washer 33, mounted between member 8 and armature 23, around the pin 24 serves to lubricate the parts to prevent sticking. The construction of the solenoid is otherwise of a generally known character.

The switch shown in Fig. 3 is of somewhat modified construction. In this figure the impact detecting member comprises a ball portion 34, an impact detecting rod or spindle 35, and a contact actuating stud 36 balanced about the centre of the ball so as to be unaffected by inertia forces. The ball member 34 is mounted upon a brass plate 37 to which it is held by a clamping plate 38, secured by means of studs 39 to the plate 37. The plate 38 is held by springs 40, retained by nuts 41 on studs 39, these parts being mounted upon a plate 42 secured with bracket members 43 to an aircraft structure member 44 disposed adjacent the aircraft surface skin 13.

Stud 36 engages a crater shaped surface upon a contact actuator 45 which is urged into contact therewith by spring 46, the end of stud 36 being hemispherical whereas the crater is shaped so that a slight lift of actuator 45 is necessary when stud 36 and spindle 35 are displaced, thus creating a tendency to retain the parts in the approximately vertical position. Actuator 45 may be of moulded insulation material having a conducting member 47 secured therein and adapted when the switch device is operated, to close contacts 20 connected to terminals 19 to which cable 48 is connected, the parts being mounted in an insulated terminal block 49 provided with a cover plate 50. The actuator 45 is guided by means of a projection 51 engaging a correspondingly shaped recess 52 formed in the cover 50.

The provision of protecting hoods such as 17 shown in Figs. 1 and 2 upon aircraft skin surfaces is objectionable owing to the interference with the air flow over the surface, and with a view to overcoming this objection the switch device shown in Fig. 3 is mounted behind the aircraft skin surface 13. However, in order to obtain actuation of the switch the portion of the skin 13 immediately below the switch device which is soft or of reduced strength is provided with a pyramid or cone 54 normally disposed centrally below spindle 35 and the end of this spindle is rounded, as indicated in Fig. 3 so that if the soft surface skin portion 53 is deflected, as shown in chain lines in Fig. 3, the cone 54 will displace spindle 35 into a position shown in chain lines, whereby actuation of the switch is effected.

The result of the construction shown in Fig. 3 is that the skin surface of the aircraft retains its normal smooth or curved, or otherwise shaped contour so that there is no interference with the air flow due to the projection of the impact detecting switch device. If, however, the aircraft should crash so that the surface portion 53 of reduced strength is distorted, for example by contact with the ground or other obstruction, actuation of the impact detecting device is nevertheless obtained, and this arrangement has therefore important technical advantages from the point of view of retaining the normal characteristics of aircraft skin surfaces.

Referring now to Fig. 4, the general contour of an aircraft fuselage is indicated by $b$. Only one wing is shown and is denoted $c$, and the engine cowling or nacelle is denoted $d$.

Electrical impact detecting switch devices according to Figs. 1 and 2 are denoted $e$, and two of these are indicated as being mounted approximately centrally below the fuselage, whereas other switches will be mounted adjacent or near the wing tips, or below the engine nacelles so that actuation of the fire preventing or fire extinguishing equipment is assured in the event of any likely part of the aircraft forceably striking the ground or an obstruction as in a crash landing or the like.

The fire preventing or extinguishing appliances comprise a fire extinguishing fluid container $f$ generally connected to the air intake of an aero engine and another fire extinguishing fluid container $g$ generally connected to fire extinguishing fluid distributing pipes arranged over the aero engines in nacelles $d$ in a known manner.

Fire extinguishing containers $f$ and $g$ are arranged to be electrically operated and are controlled by a relay $h$ which comprises a plurality of electrical contacts normally held in the open position but capable of closure when a solenoid or electromagnetic relay $z$ is energised from any one of impact detectors $e$ or from a known type of crash switch $i$, said extinguisher containers being electrically operated to discharge instantaneously when the contacts of relay $h$ are closed.

As previously described in order to prevent inadvertent operation of impact detectors $e$, the impact detector member is locked by a solenoid $a$ said solenoids being controlled by a control switch $j$ which may be manually operated to permit the switches to be unlocked during take-off or landing operations, and again locked as soon as the aircraft is in flight or when it has come to a standstill on the ground.

In order to ensure that devices $e$ shall be unlocked during a forced landing or similar operation when the pilot or other crew member may not operate switch $j$ manually, the switch is also arranged to be inertia operated and is normally set at a comparatively low value of $g$ so as to ensure that device $e$ shall be unlocked if the aircraft undergoes comparatively minor deceleration effects, for example during a forced landing upon water, sand or mud.

Apart from the crash or impact actuated fire prevention or extinguishing equipment, aircraft are normally provided with a fire or flame detector device $k$ adapted to light fire warning lamps $l$ if a fire should occur on one of the aero engines for example during flight or on the ground, and fire extinguisher push button control switches $m$ are provided which the pilot or other crew member can operate when the warning light $l$ is energised. Operation of switch $m$ effects instant discharge of the extinguisher $f$ which tends to choke the engine, and a delay action switch $n$ effects delayed discharge of the extinguisher $g$, some 10 seconds after operation of switch $m$, at which stage the engine should have ceased to fire and to rotate. This latter arrangement being generally known.

What I claim and desire to secure by Letters Patent is:

1. Fire preventing or extinguishing apparatus for aircraft comprising fire fighting apparatus carried by the aircraft for preventing or extinguishing fires, electrical apparatus for controlling said fire fighting apparatus, an electric switch connected to control said electrical apparatus, an impact detecting member normally positioned so as to hold said switch in a predetermined position, means for mounting said impact detecting member adjacent to the surface skin of the aircraft, and a member supported by the surface skin of the aircraft for actuating said impact detecting member to release said switch when the surface skin of said aircraft contacts an obstruction and is deformed thereby so that said fire fighting apparatus is actuated.

2. Fire preventing or extinguishing apparatus for aircraft comprising fire fighting apparatus carried by the aircraft for preventing or extinguishing fires, electrical apparatus for controlling said fire fighting apparatus, an electric switch connected to control said electrical apparatus, an impact detecting member normally positioned so as to hold said switch in a predetermined position, electrically controlled means for locking said impact detecting member in the aforesaid normal position, means for mounting said impact detecting member adjacent to the surface skin of the aircraft, and a member supported by the surface skin of the aircraft for actuating said impact detecting member to release said switch when the surface skin of said aricraft contacts an obstruction and is deformed thereby whereby said fire fighting apparatus is actuated.

3. Fire preventing or extinguishing apparatus for aircraft comprising fire fighting apparatus carried by the aircraft for preventing or extinguishing fires, electrical apparatus for controlling said fire fighting apparatus, an electric switch connected to control said electrical apparatus, an impact detecting member normally positioned so as to hold said switch in a predetermined position, said impact detecting member including a pendulum, means for mounting said pendulum of said impact detecting member externally of the surface skin of the aircraft, and a flexible hood for shielding said pendulum, said impact detecting member being adapted to release said switch when the surface of said flexible hood contacts an obstruction so that said fire fighting apparatus is actuated.

4. Fire preventing or extinguishing apparatus for aircraft as set forth in claim 1 further characterized in that the surface skin of the aircraft surrounding said impact detecting member is flexible and capable of distortion when struck by an obstruction.

5. Fire preventing or extinguishing apparatus as set forth in claim 1 further characterized in that the surface skin of the aircraft adjacent to said impact detecting member is provided with means adapted to effect displacement of said impact detecting member when said surface skin is struck by an obstruction.

6. Fire preventing or extinguishing apparatus as set forth in claim 1 further comprising means for locking said impact detecting member and means for unlocking said locking means during take off or landing of the aircraft.

7. Fire preventing or extinguishing apparatus as set forth in claim 1 further comprising electromagnetic means for locking said impact detecting member, said electromagnetic means comprising a solenoid and a spring urged armature having means for engaging and locking said impact detecting member in an inoperative position, and connections for energizing said solenoid to displace said armature and unlock said impact detecting member and render it operative.

8. Fire preventing or extinguishing apparatus as set forth in claim 1 further comprising electromagnetic means for locking said impact detecting member, said electromagnetic means comprising a solenoid and a spring urged armature having means for engaging and locking said impact detecting member in an inoperative position, said last mentioned means including a member adapted to be fractured to unlock said impact detecting member when abnormal impact is applied thereto, and connections for energizing said solenoid to displace said armature and unlock said impact detecting member and render it operative.

9. Fire preventing or extinguishing apparatus as set forth in claim 2 further comprising means for unlocking said impact detecting member during take off or landing of the aircraft.

10. Fire preventing or extinguishing apparatus as set forth in claim 2 further comprising automatic inertia operated means for unlocking said impact detecting member.

11. Fire preventing or extinguishing apparatus for aircraft comprising fire fighting apparatus carried by the aircraft for preventing or extinguishing fires, electrical apparatus for controlling said fire fighting apparatus, an electric switch connected to control said electrical apparatus, an impact detecting member normally positioned to hold said switch in a predetermined position, said impact detecting member including a pendulum, means for mounting said pendulum to project exteriorly of the surface skin of the aircraft adjacent to a wing tip of the aircraft, and means for rendering said impact detecting member inoperative except during take off or landing of the aircraft so that said fire fighting apparatus of the aircraft may be actuated during take off or landing of the aircraft if the aircraft contacts an obstruction.

12. Fire preventing or extinguishing apparatus for aircraft comprising fire fighting apparatus carried by the aircraft for preventing or extinguishing fires, electrical apparatus for controlling said fire fighting apparatus, electric switches connected to control said electrical apparatus, impact detecting members normally positioned to hold said switches in predetermined positions, each of said impact detecting members including pendulum, means for mounting said pendulums to project exteriorly of the surface skin of the aircraft, selected ones of said pendulums being mounted near the wing tips of the aircraft, and means for rendering said impact detecting members inoperative except during take off or landing of the aircraft so that said fire fighting apparatus may be actuated thereby during take off or landing of the aircraft if the aircraft contacts an obstruction.

13. Fire preventing or extinguishing apparatus for aircraft comprising fire fighting apparatus carried by the aircraft for preventing or extinguishing fires, electrical apparatus for controlling said fire fighting apparatus, electric switches connected to control said electrical apparatus, impact detecting members normally positioned to hold said switches in predetermined positions, means for mounting said impact detecting members to project exteriorly of the surface skin of the aircraft, selected ones of said impact detecting members being mounted near the wing tips of the aircraft, and means for rendering said impact detecting members inoperative except during take off or landing of the aircraft so that said fire fighting apparatus may be actuated thereby during take off or landing of the aircraft if the aircraft contacts an obstruction.

ANDERS MATHISEN.

REFERENCES CITED

The following references are of record in the file of this patent:

UNITED STATES PATENTS

| Number | Name | Date |
|---|---|---|
| 2,010,897 | Roder | Aug. 13, 1935 |
| 2,013,924 | Nolte | Sept. 10, 1935 |
| 2,176,770 | Maught | Oct. 17, 1939 |
| 2,189,147 | Mathisen | Feb. 6, 1940 |
| 2,242,679 | Salmond et al. | May 20, 1941 |

FOREIGN PATENTS

| Number | Country | Date |
|---|---|---|
| 385,897 | Great Britain | Jan. 5, 1933 |